June 11, 1957 V. SANTARELLI 2,795,079
PORTABLE GARDEN DUSTER
Filed April 19, 1955 2 Sheets-Sheet 1

INVENTOR.
VINCENT SANTARELLI
BY

June 11, 1957 V. SANTARELLI 2,795,079
PORTABLE GARDEN DUSTER
Filed April 19, 1955 2 Sheets-Sheet 2

INVENTOR.
VINCENT SANTARELLI
BY

United States Patent Office 2,795,079
Patented June 11, 1957

2,795,079

PORTABLE GARDEN DUSTER

Vincent Santarelli, Detroit, Mich.

Application April 19, 1955, Serial No. 502,418

3 Claims. (Cl. 43—145)

This invention relates to an improved portable garden duster of the type adapted for dispersing insecticide in the form of dust onto plants and the like.

It is an important object of this invention to provide a portable garden duster comprising, a container having a storage compartment for insecticide, a flow control means for controlling the amount of insecticide flowing from said storage compartment, means for mixing and agitating the insecticide in the storage compartment, an impeller for propelling the insecticide, flowing from said container, into a discharge pipe for deposition on to plants and the like, and, an improved combined sprocket and ratchet drive means for driving said impeller and agitator.

It is another object of this invention to provide a portable garden duster having a storage compartment for holding an insecticide in the form of dust, and, means for agitating and expelling the dust from said storage compartment, which means are driven by a sprocket drive unit which is actuable by a manually operated rock shaft and ratchet mechanism.

It is a further object of this invention to provide a novel garden duster including an improved combined sprocket and ratchet type drive means for simultaneously driving an agitator and impeller in said duster.

It is another object of this invention to provide a portable garden duster which is compact and rugged in construction, economical of manufacture, and efficient in use.

Other objects will appear hereinafter.

It is recognized that various modifications and changes may be made in the details of the structure illustrated without departing from the invention, and, it is intended that the present disclosure shall be considered to be but the preferred embodiment.

Forming a part of the application is a drawing, in which.

Figure 1:
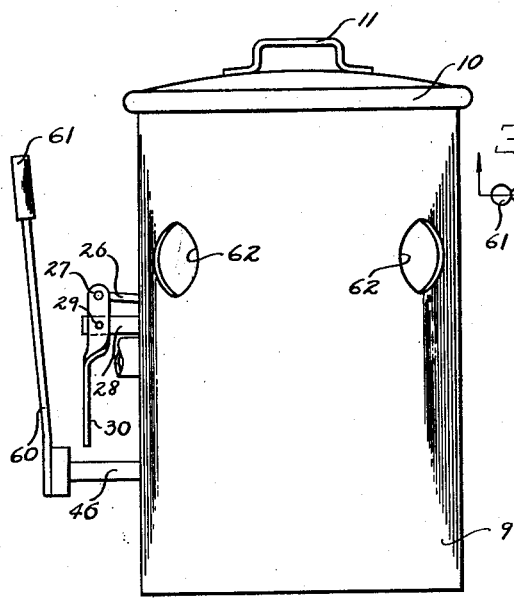
Fig. 1 is an elevational view of a preferred embodiment of the invention.
Figure 2:
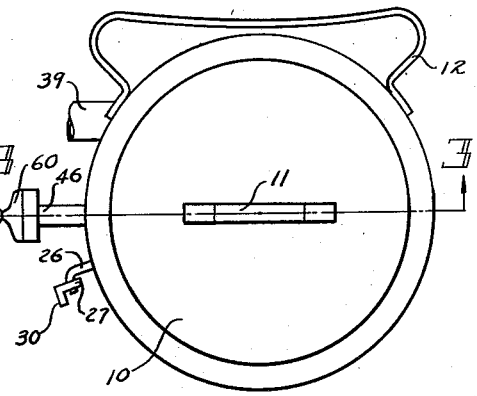
Fig. 2 is a top plan view of the structure illustrated in Fig. 1.

In the drawing, a preferred embodiment is shown, which comprises, a cylindrical container 9 which is provided with a suitable cover 10, having a handle 11. As shown in Fig. 2, a handle 12 is fixedly mounted on the side of the container 9, to provide a means for carrying the duster.

Figure 3:
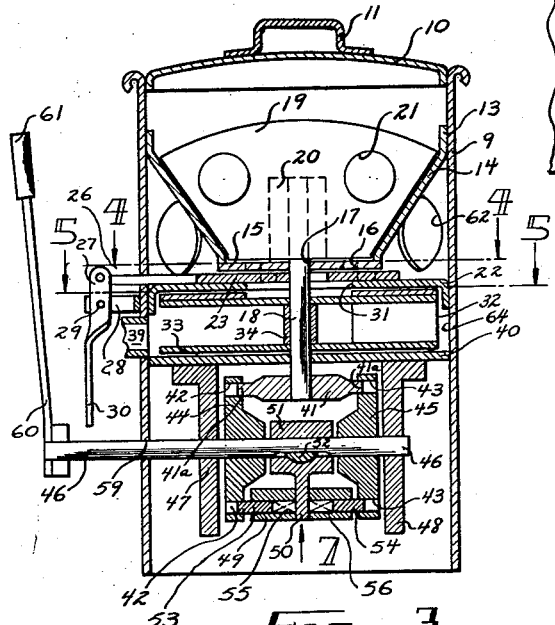
Fig. 3 is an elevational sectional view of the structure illustrated in Fig. 2, taken along the line 3—3 thereof.

As shown in Fig. 3, a storage compartment for insecticide, in the form of dust, is provided in the upper end of the container, by means of the vertically disposed, circular partition 13, which is fixedly secured to the inner surface of the walls of the container 9. Integral with the partition 13 is a downwardly and inwardly sloping partition 14 which is substantially funnel-shaped, and, which carries on the lower end thereof, a perforated plate 15, which is provided with a plurality of apertures or perforations therethrough, as 16. The perforated plate 15 is provided with a centrally located aperture 17 in which is rotatably mounted a vertical drive shaft 18 for driving a plate-like, vertically disposed agitator 19. A connection means 20 is provided for fixing the agitator 19 on the upper end of the shaft 18. The agitator 19 is provided with holes therethrough, as at 21.

Figure 4:
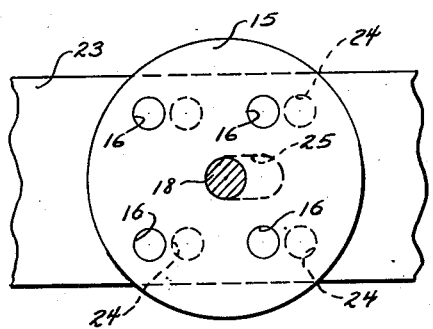
Fig. 4 is a fragmentary horizontal view of the structure illustrated in Fig. 3, taken along the line 4—4 thereof.

A horizontally disposed transverse supporting bracket 22 is fixedly mounted in the container 9, below the perforated plate 15. A second perforated plate 23 is slidably mounted on the supporting bracket 22 at a point immediately below the perforated plate 15. As shown in Figs. 3 and 4 the slidable perforated plate 23 is provided with a plurality of perforations therethrough, as 24, and, said plate is further provided with an elongated slot 25 through which the vertical drive shaft 18 passes. The slidable perforated plate 23 is provided with a handle 26 by means of which said plate may be adjusted inwardly and outwardly, relative to the stationary perforated plate 15, whereby, the perforations 16 and 24 may be brought into registration with each other, and, the outward flow of the insecticide from a storage compartment may be manually and accurately controlled, as desired. The handle 26 is pivotally mounted in a control lever 27 which is pivoted at the point 29 on a bracket 28 that is fixed on the side of the container 9. The control lever 27 is provided with a handle 30.

Figure 5:
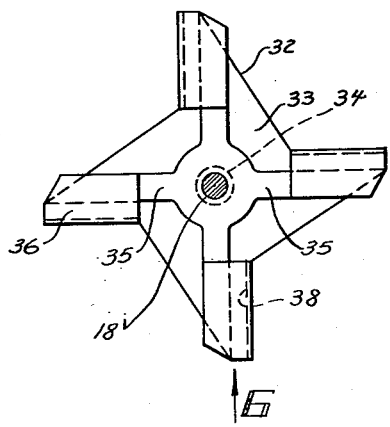
Fig. 5 is a top plan view of the impeller employed in the invention, as viewed in Fig. 3, along the line 5—5 thereof, and looking in the direction of the arrows.
Figure 6:
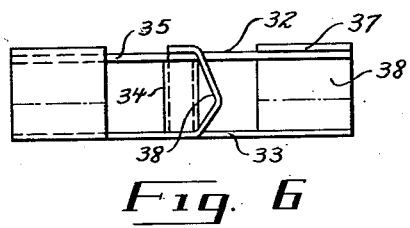
Fig. 6 is a side elevational view of the impeller shown in Fig. 5, taken in the direction of the arrow 6.

The supporting bracket 22 is provided with a central opening 31 through which the insecticide is permitted to pass, and, thereby, fall on the plate 33 of the impeller which is generally indicated by the numeral 32. As shown in Fig. 3, the impeller 32 is operatively mounted in a discharge compartment 64 which is disposed below the storage compartment and which is enclosed on the upper end by the bracket 22 and on the lower end by the bracket 40. As best seen in Figs. 5 and 6, the impeller 32 comprises a lower plate 33, on which is mounted an upwardly extending hub 34 adapted to be fixedly secured to the drive shaft 18, by any suitable means. Fixedly mounted on the top of the impeller hub 34 is a plurality of outwardly extending arms 35 which are disposed in substantially perpendicular directions relative to each other. A plurality of substantially U-shaped impeller blades 36 are provided which are formed by means of a portion of the plate 33 being folded upwardly and over the arms 35 and into a fixed engagement therewith, as indicated by the numeral 37. The bight portion of the U-shaped impeller blades 36 is generally indicated by the numeral 38. It will be obvious, that as the drive shaft 18 revolves the impeller 32, any insecticide dust which has fallen on the impeller plate 33 will be thrown or impelled outwardly by centrifugal force, and, then, the dust will be caught by the blades 36 and propelled out of the discharge compartment 64 of the container through the discharge pipe 39. A suitable discharge nozzle (not shown) may be attached to the discharge pipe or conduit 39.

Fixedly mounted below the impeller 32, on the inner side of the walls of the container 9, by any suitable means, is a transverse, air-tight, supporting bracket 40 through the center of which is rotatably mounted the drive shaft 18. As shown in Fig. 3, a drive sprocket 41 is fixedly mounted on the lower end of the drive shaft 18, and is provided with suitable sprocket teeth 41a which are adapted to meshably engage the mating apertures 42 and 43, in a pair of circular sprocket drive wheels, 44 and 45, respectively. The sprocket drive wheels 44 and 45 are spaced apart and are rotatably carried on a horizontal rock shaft 46 which is journalled in a pair of spaced supporting brackets 47 and 48 which depend from the bracket 40. The sprocket drive wheels 44 and 45 are driven by means of a ratchet mechanism 49 which is carried by a depending arm 50. The arm 50 is integral with a carrier 51 which is locked on the rock shaft 46, by means of a key, as 52.

Figure 7:
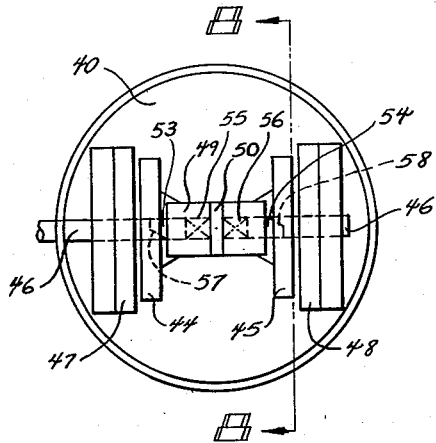
Fig. 7 is a bottom plan view of the structure illustrated in Fig. 3, taken in the direction of the arrow 7; and, Fig. 8 is an elevational view, partly in section, of the structure illustrated in Fig. 7, taken along the line 8—8 thereof.

The ratchet mechanism 49 is provided with a pair of slidably mounted ratchets 53 and 54 which are biased outwardly by a pair of springs 55 and 56, respectively, and which are adapted to operatively engage the holes 42 and 43 in the sprocket wheels 47 and 48, respectively, in an alternate manner. As shown in Fig. 7, the ratchets 53 and 54 are tapered on one side thereof, as at 57 and 58, respectively, to permit the non-working ratchet to be biased out of the mating hole in the respective sprocket wheel when the rock shaft is actuating the working ratchet.

As shown in Fig. 3, the rock shaft 46 passes through the container 9, by means of the aperture 59, and is provided with a lever 60 having a handle 61. The container 9 is provided with a plurality of apertures through the sides thereof, as 62, to permit the impeller 32 to draw in air to be mixed with the insecticide dust for dispersion outwardly through the discharge pipe 39.

Figure 8:
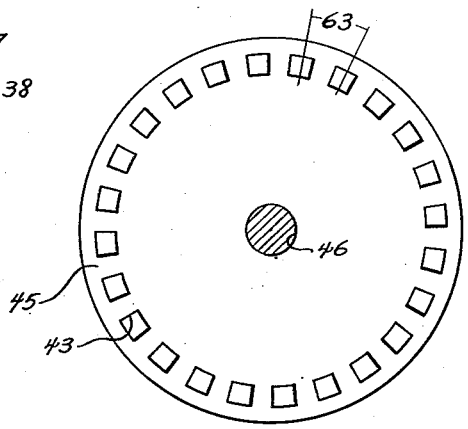

In the use of the invention, the container storage compartment would be filled with a suitable insecticide in the form of dust, and the cover 10 would be mounted in place. The lever 30 would then be actuated to move the adjustable plate 23 outwardly to aline the perforations 16 and 24, and permit the insecticide dust to drop down into the impeller compartment in a desired amount or volume. The discharge nozzle (not shown), would then be directed toward the objects to be dusted, and, the operator would then grasp the rock shaft lever handle 61 and actuate the lever 60 backwardly and forwardly. It will be seen, that the lever 60 will provide the rock shaft 46 with a rocking movement which will in turn actuate the ratchets 53 and 54 in an alternate manner. For example, when the shaft 46 is rocked in a clockwise direction, as viewed in Fig. 7, the straight side of the ratchet 54 will engage one of the apertures 43 in the sprocket wheel 45 and drive said wheel a distance equal to the center to center distance between adjacent apertures 43, as indicated by the numeral 63 in Fig. 8. At the end of the afordescribed movement, the rock shaft 46 is moved in the opposite direction, and, the ratchet 53 moves the sprocket wheel 42 in a similar manner. It will be obvious, that when one of the ratchets is not working, or providing a driving force, it will slip out of its corresponding sprocket wheel aperture due to the tapered edges 57 and 58. It will be seen, that the aforementioned ratchet arrangement provides a drive means, for driving a pair of sprocket wheels, which is very effective and efficient, and, which may be operated by a simple backward and forward movement by the operating lever 60.

The sprocket wheels 44 and 45 rotate in opposite directions, but engage the sprocket 41 at opposite sides thereof, and, accordingly, the sprocket 41 will be driven in the same direction by the coaction of both sprocket wheels, and, with a continuous motion. It will be seen, that the instant drive mechanism is arranged so that continuous clockwise rotation of the impeller 32 is effected. When the dusting operation is finished, the operator will stop moving the lever 60 and move the flow control lever 26 inwardly to stop the flow of insecticide into the impeller chamber. It will be obvious, that during the dusting operation, the drive shaft 18 turns the agitator 19 at the same rate of speed as the impeller 32, to provide a thorough mixing of the insecticide and insure a steady flow of the insecticide downwardly to the stationary perforated flow control plate 15.

What is claimed is:
1. A portable dusting device of the class described, comprising a storage compartment for holding a quantity of insecticide dust; a discharge compartment disposed below said storage compartment; a flow control means for feeding the dust at a controlled rate from said storage compartment into said discharge compartment; an agitator operatively mounted in said storage compartment for mixing the insecticide dust; an impeller operatively mounted in said discharge compartment; a discharge outlet communicating with said discharge compartment through which said impeller may discharge the insecticide dust; a drive means connected to said agitator and said impeller for unitary drive thereof; a sprocket fixed to said drive means; a pair of spaced apart rotatable sprocket wheels meshably engaging said sprocket at diametrically opposite positions, a rock shaft rotatably mounted in said device; said sprocket wheels being rotatably carried by said rock shaft; a ratchet carrier fixed on said rock shaft; a pair of oppositely directed spring biased ratchets on said carrier and adapted to operatively engage apertures in said sprocket wheels for actuating said wheels in opposite directions of rotation; and a lever fixed on said rock shaft for rocking said shaft, whereby, said ratchets will alternately actuate the sprocket wheels, the sprocket wheels will rotate the sprocket, and, the impeller and the agitator will thus be operated.

2. A portable dusting device of the class described, comprising: a storage compartment for holding a quantity of insecticide dust; a discharge compartment disposed below said storage compartment; the bottom of said storage compartment being provided with a plurality of apertures therethrough; a plate slidably mounted between said compartments in a transverse position and engageable with the bottom of said storage compartment; said plate being provided with a plurality of apertures therethrough which will register with the apertures in the bottom of said storage compartment when the plate is moved to one position to connect said compartments, and, which will not register when the plate is moved to another position; a rotatable vertical drive shaft centrally mounted in said device and passing through said compartments; an agitator in said storage compartment for mixing the insecticide dust and being fixed to said drive shaft; an impeller disposed in said discharge compartment and being fixed to said drive shaft; a discharge outlet communicating with said discharge compartment through which said impeller may discharge the insecticide dust; a sprocket fixed to said drive shaft; a pair of spaced apart rotatable sprocket wheels meshably engaging said sprocket at diametrically opposite directions; a rock shaft rotatably mounted in said device; said sprocket wheels being rotatably carried by said rock shaft; a ratchet carrier fixed on said rock shaft; a pair of oppositely directed spring biased ratchets on said carrier and adapted to operatively engage apertures in said sprocket wheels for actuating said wheels in opposite directions of rotation; and a lever fixed on said rock shaft for rocking said shaft, whereby, said ratchets will alternately actuate the sprocket wheels, the sprocket wheels will rotate the sprocket, and, the impeller and the agitator will thus be operated.

3. A portable dusting device of the class described, comprising: a storage compartment for holding a quantity of insecticide dust; the lower part of said storage compartment tapering downwardly and inwardly, and terminating in a bottom part which is provided with a plurality of perforations therethrough; a discharge compartment disposed below said storage compartment; a plate slidably mounted between said compartments and engageable with the bottom of said storage compartment; said plate being provided with a plurality of perforations therethrough which will register with the perforations in the bottom of said storage compartment when the plate is moved to one position to connect said compartments, and, which will not register when the plate is moved to another position; a rotatable vertical drive shaft centrally mounted in said device and passing through said compartments; an agitator in said storage compartment for mixing the insecticide dust and being fixed to said drive shaft; an impeller disposed in said discharge compartment and being fixed to said drive shaft; a discharge outlet communicating with said discharge compartment through which said impeller may discharge the insecticide dust; a sprocket fixed to said drive shaft; a pair of spaced apart rotatable sprocket wheels meshably engaging said sprocket at diametrically opposite positions; a rock shaft rotatably mounted in said device; said sprocket wheels being rotatably carried by said rock shaft; a ratchet carrier fixed on said rock shaft; a pair of oppositely directed spring biased ratchets on said carrier and adapted to operatively engage apertures in said sprocket wheels for actuating said wheels in opposite directions of rotation, and a lever fixed on said rock shaft for rocking said shaft, whereby, said ratches will alternately actuate the sprocket wheels, the sprocket wheels will rotate the sprocket, and, the impeller and the agitator will thus be operated.

References Cited in the file of this patent

UNITED STATES PATENTS

| | | |
|---|---|---|
| 159,016 | Bond | Jan. 26, 1875 |
| 421,942 | Leggett | Feb. 25, 1890 |
| 2,668,060 | Tygart | Feb. 2, 1954 |

FOREIGN PATENTS

| | | |
|---|---|---|
| 58,902 | France | Dec. 2, 1953 |

(First addition to No. 934,683)